(12) United States Patent
Chiang et al.

(10) Patent No.: US 10,860,769 B2
(45) Date of Patent: *Dec. 8, 2020

(54) METHOD AND SYSTEM FOR INTEGRATED CIRCUIT DESIGN WITH ON-CHIP VARIATION AND SPATIAL CORRELATION

(71) Applicant: Taiwan Semiconductor Manufacturing Co., Ltd., Hsin-Chu (TW)

(72) Inventors: Katherine Chiang, New Taipei (TW); Cheng Hsiao, Hsinchu (TW); Chang-Yu Huang, Hsinchu County (TW); Juan Yi Chen, Hsinchu (TW); Ke-Wei Su, Hsinchu County (TW); Chung-Kai Lin, Taipei (TW); Lester Chang, Hsinchu (TW); Min-Chie Jeng, Taipei (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,255

(22) Filed: Dec. 19, 2019

(65) Prior Publication Data
US 2020/0125782 A1      Apr. 23, 2020

Related U.S. Application Data

(63) Continuation of application No. 15/335,091, filed on Oct. 26, 2016, now Pat. No. 10,521,538.
(Continued)

(51) Int. Cl.
*G06F 30/39*     (2020.01)
*G06F 30/367*    (2020.01)
*G06F 7/58*      (2006.01)

(52) U.S. Cl.
CPC .............. *G06F 30/39* (2020.01); *G06F 7/588* (2013.01); *G06F 30/367* (2020.01)

(58) Field of Classification Search
CPC ........ G06F 30/39; G06F 30/367; G06F 7/588; G06F 2111/08; G06F 30/3312; G06F 30/394; G06F 30/392; G06F 30/398
See application file for complete search history.

(56) References Cited

U.S. PATENT DOCUMENTS 7,904,857 B2   3/2011   Wang et al.
7,992,114 B1   8/2011   Adams et al.
(Continued)

FOREIGN PATENT DOCUMENTS

CN    201837703    5/2011
TW    201122883    7/2011

*Primary Examiner* — Nha T Nguyen
(74) *Attorney, Agent, or Firm* — Haynes and Boone, LLP

(57) ABSTRACT

An integrated circuit (IC) design method includes receiving a spatial correlation matrix, R, of certain property of post-fabrication IC devices; and deriving a random number generation function g(x, y) such that random numbers for a device at a coordinate (x, y) can be generated by g(x, y) independent of other devices, and all pairs of random numbers satisfy the spatial correlation matrix R. The method further includes receiving an IC design layout having pre-fabrication IC devices, each of the pre-fabrication IC devices having a coordinate and a first value of the property. The method further includes generating random numbers using the coordinates of the pre-fabrication IC devices and the function g(x, y); deriving second values of the property by applying the random numbers to the first values; and providing the second values to an IC simulation tool.

20 Claims, 9 Drawing Sheets

Related U.S. Application Data

(60) Provisional application No. 62/328,423, filed on Apr. 27, 2016.

(56) References Cited

U.S. PATENT DOCUMENTS

| | | |
|---|---|---|
| 8,601,416 B2 | 12/2013 | Kuo et al. |
| 8,762,900 B2 | 6/2014 | Shin et al. |
| 8,766,703 B1 | 7/2014 | Yang et al. |
| 8,775,993 B2 | 7/2014 | Huang et al. |
| 8,887,116 B2 | 11/2014 | Ho et al. |
| 9,099,639 B2 | 8/2015 | Kim et al. |
| 9,459,314 B1 | 10/2016 | Chang |
| 10,185,795 B1 | 1/2019 | Keller et al. |
| 2007/0174797 A1 | 7/2007 | Luo et al. |
| 2008/0295046 A1 | 11/2008 | Su et al. |
| 2009/0019408 A1* | 1/2009 | Saito ................ G05B 19/41875 716/106 |
| 2009/0140245 A1 | 6/2009 | Oppold |
| 2009/0144024 A1 | 6/2009 | Oppold |
| 2009/0206821 A1 | 8/2009 | Meterelliyoz et al. |
| 2010/0058258 A1 | 3/2010 | Do et al. |
| 2011/0035715 A1 | 2/2011 | Lu et al. |
| 2013/0073266 A1 | 3/2013 | Trombley et al. |
| 2013/0179127 A1 | 7/2013 | Lu |
| 2014/0101623 A1 | 4/2014 | Chen et al. |
| 2014/0201692 A1 | 7/2014 | Chen et al. |
| 2014/0237435 A1 | 8/2014 | Chen et al. |
| 2014/0282337 A1 | 9/2014 | Yuh et al. |
| 2014/0304670 A1 | 10/2014 | Su et al. |
| 2014/0310675 A1 | 10/2014 | Liu et al. |
| 2014/0325464 A1 | 10/2014 | Hsu et al. |
| 2015/0177327 A1 | 6/2015 | Chien et al. |
| 2017/0206301 A1 | 7/2017 | Wrixon et al. |

* cited by examiner

METHOD AND SYSTEM FOR INTEGRATED CIRCUIT DESIGN WITH ON-CHIP VARIATION AND SPATIAL CORRELATION

PRIORITY

This application is a continuation of U.S. patent application Ser. No. 15/335,091, filed Oct. 26, 2016, which claims the benefits of U.S. Provisional Application Ser. No. 62/328,423, entitled "Method and System for Integrated Circuit Design with On-Chip Variation and Spatial Correlation," filed Apr. 27, 2016, herein incorporated by reference in its entirety.

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs.

Another aspect of the IC evolution involves increased IC design complexity and shortened time-to-market. Designers generally face a demanding project schedule from IC conception to IC production. To meet these challenges, designers generally perform simulations on an IC design, and check the performance and functionality of the IC design as thorough as possible before taping it out. A realistic simulation takes into account of variations in device properties across an entire area of the IC. Such variations are commonly referred to as on-chip variation (OCV). OCV in a fabricated IC may be caused by factors such as channel length variations among transistors; hot spots in the IC; variations in interconnect lengths; and so on. A typical OCV modeling uses local variations, assuming a fixed percentage change of circuit property (e.g., propagation delay) for timing analysis. However, it has been found that local variations are not a fixed value across the entire area of an IC chip, and are in fact a function of distances among the devices (such as transistors). This phenomenon is called OCV spatial effects.

To obtain more realistic IC simulations, attempts have been made to model OCV spatial effects by creating spatially correlated random variations in device properties. Such random variations must simultaneously satisfy correlation constraints between all pairs of devices. As the number of devices on an IC increases, this task has become increasingly challenging.

Accordingly, what is needed is improvement in this area.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
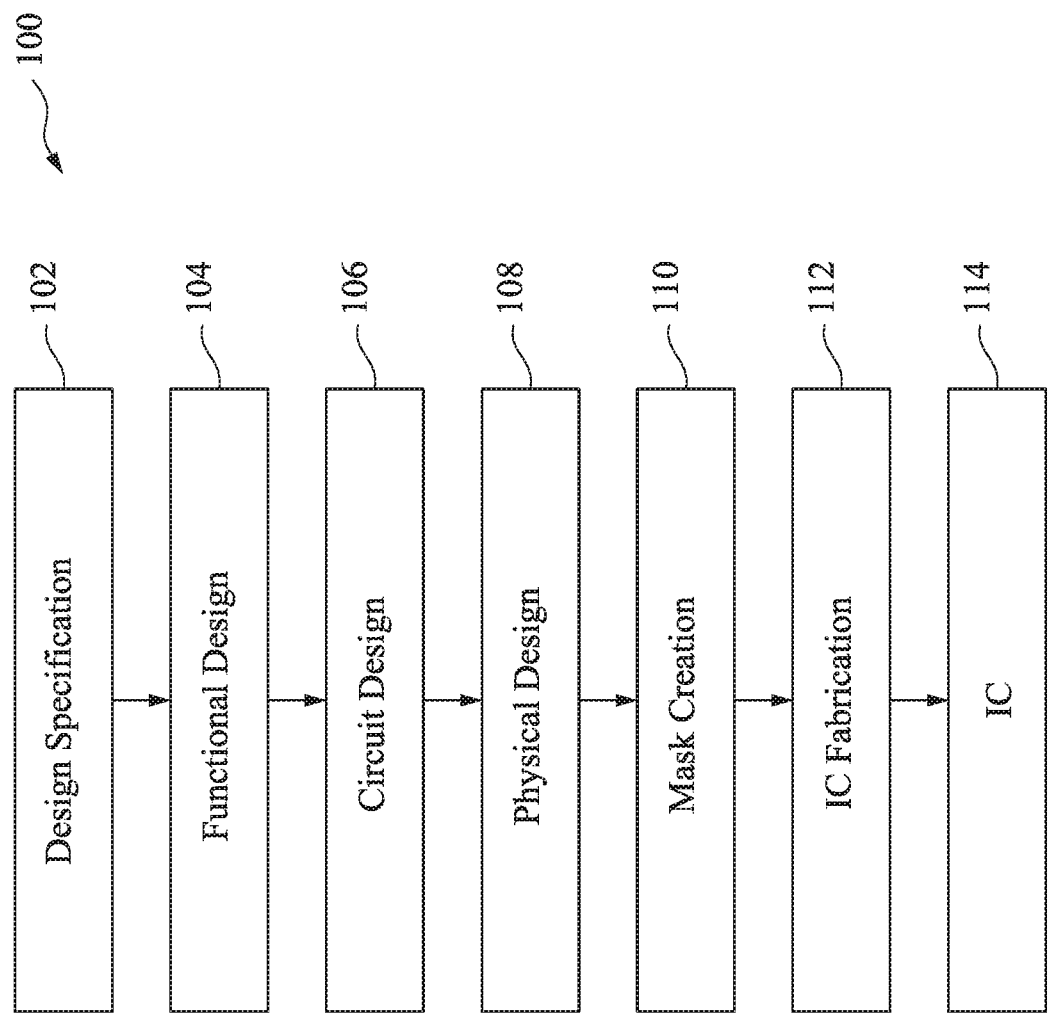
FIG. 1 is a simplified block diagram of an embodiment of an integrated circuit (IC) design and manufacturing flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to methods for IC design and manufacturing, and more particularly to methods for modeling OCV with spatial effects in order to provide realistic IC simulation during IC design.

FIG. 1 is a simplified block diagram of an embodiment of an integrated circuit (IC) design and manufacturing flow 100 to produce an IC 114. The IC design flow 100 may benefit from aspects of the present disclosure. The IC design flow 100 typically starts with a design specification 102 which includes the design requirements of the IC 114. It then proceeds to functional design 104 where the design of the IC 114 is partitioned into a plurality of functional blocks and the plurality of functional blocks interact to produce the desired functionalities.

The IC design flow 100 then proceeds to circuit design 106. In an example, the circuit design 106 uses a bottom-up hierarchical approach where a plurality of cells are built with elementary circuit components such as resistors, capacitor, and transistors, then more complex functional blocks are built with the plurality of cells as components. Various components within a cell are coupled to form desired functionality for the cell. One mechanism for the coupling is through interconnect, also called routing. Various Computer Aided Design (CAD) tools are available to capture the design of the cells, the design of the functional blocks, and the design of the IC into a computer readable file. In an embodiment, the IC design is described in Register Transfer Level (RTL) language such as Verilog or VHDL and then is synthesized into a netlist. In another embodiment, the IC design is described graphically in schematic using the aforementioned hierarchical approach.

Then, the IC design flow 100 proceeds to physical design 108 where an IC design layout is produced. The IC design layout includes various geometrical patterns designed for the IC 114. The geometrical patterns correspond to patterns of metal, oxide, or semiconductor layers that make up the various components of the IC device 114 to be fabricated. The various layers combine to form various IC features. For example, a portion of the IC design layout includes various IC features, such as active regions, gate electrodes, sources and drains, metal lines and vias of an interlayer interconnection, and openings for bonding pads, to be formed in or on a semiconductor substrate (such as a silicon wafer) and various material layers disposed on the semiconductor substrate. The IC design layout is presented in one or more data files having information of the geometrical patterns. For example, the IC design layout can be expressed in a GDSII file format (or DFII file format). The physical design 108 includes various operations which will be described in greater details later in the document.

Then, the IC design flow 100 proceeds to mask creation 110 to produce one or more masks to be used for fabricating the various layers of the IC 114 according to the IC design layout. The mask creation 110 includes various tasks such as mask data preparation, where the IC design layout is translated into a form that can be physically written by a mask writer, and mask fabrication, where the design layout prepared by the mask data preparation is modified to comply with a particular mask writer and/or mask manufacturer and is then fabricated. The mask data preparation may include optical proximity correction (OPC) and lithography process checking (LPC). The mask data preparation can include further resolution enhancement techniques (RET), such as off-axis illumination, sub-resolution assist features, phase-shifting masks, other suitable techniques, or combinations thereof.

The mask fabrication may use various technologies. For example, a mask may be formed using binary technology. A binary mask includes a transparent substrate (e.g., fused quartz) and an opaque material (e.g., chromium) coated in the opaque regions of the mask. In another example, a mask is formed using a phase shift technology. In a phase shift mask (PSM), various features on the mask are configured to have proper phase difference to enhance the resolution and imaging quality. A phase shift mask can be attenuated PSM, alternating PSM, or other types of PSM.

Then, the IC design flow 100 proceeds to IC fabrication 112. The IC fabrication 112 may be performed by a myriad of manufacturing facilities. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business.

In an example, a semiconductor wafer is fabricated using the mask (or masks) to form the IC device 114. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps).

After being fabricated, the IC devices 114 typically go through packaging and testing processes before being delivered to the market.

Figure 2:
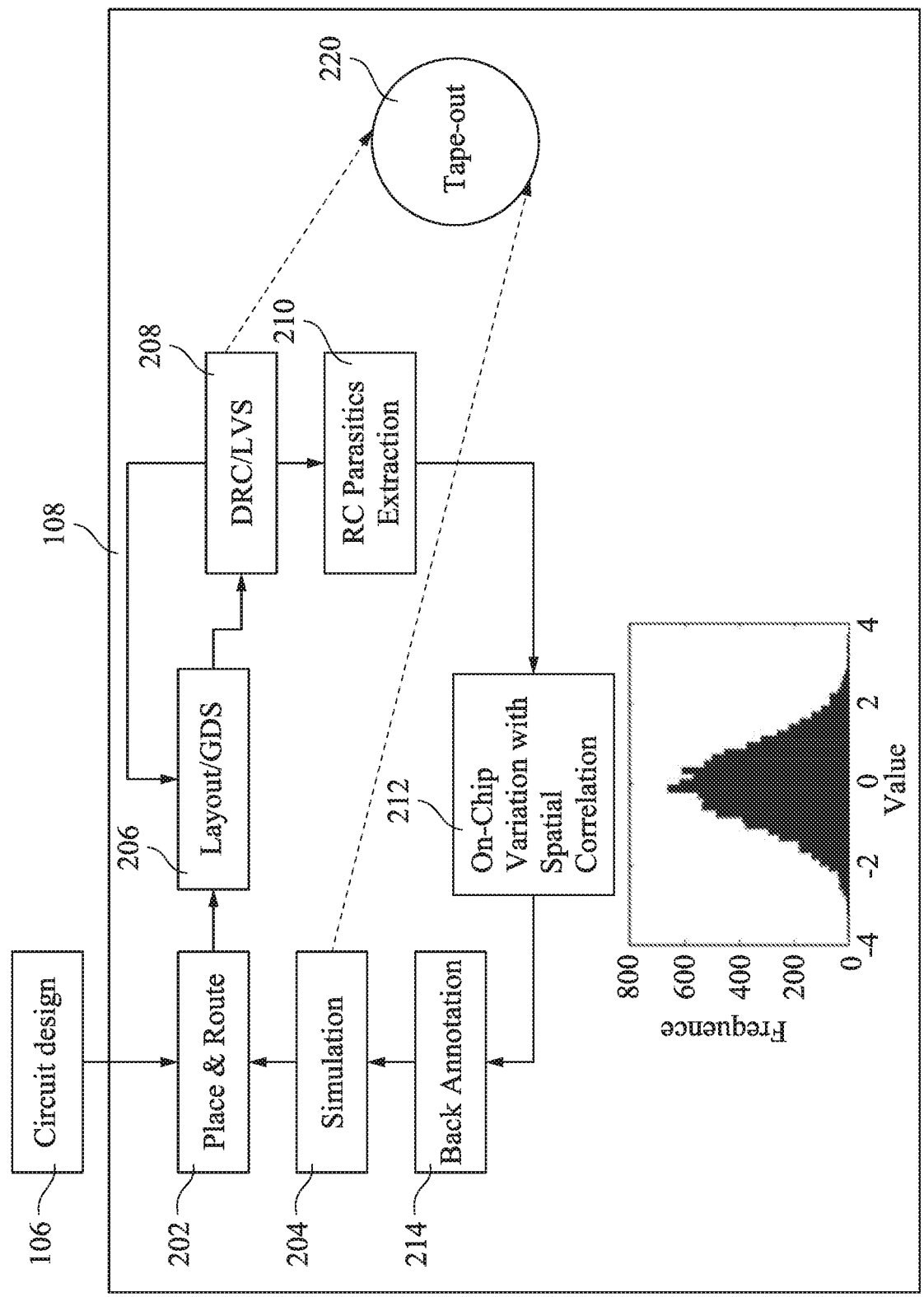
FIG. 2 is an embodiment of the IC physical design phase shown in FIG. 1 according to various aspects of the present disclosure.

FIG. 2 shows a more detailed block diagram of the physical design 108 shown in FIG. 1 according to various aspects of the present disclosure. The physical design 108 includes a place-and-route module 202. Standard cells, input/output (I/O) cells, and macros (such as SRAM blocks) can be placed in various locations according to the functional connectivity and the optimization of signal routing. The physical design 108 also includes a simulation module 204. The simulation module 204 may include functional simulation for verifying the functionality of the IC 114. The simulation module 204 may include timing simulation for verifying signal path timing. The simulation module 204 may include physical simulation, such as SPICE simulation, for verifying output signal deformation, signal level, and time delay. After placement and routing are finished at step 202, a simplified resistance and capacitance (RC) extraction of the IC is performed for the various aforementioned simulations. Routing and cell placement can be further optimized to improve simulation results. However, more detailed RC extraction of the IC is not available until the layout has been completed in the following steps.

The physical design 108 also includes layout/GDS module 206 for performing layout and creating GDS file. After optimized placement and routing, the physical layout is created (in GDS format in one example) and finalized for further layout enhancement and sign-off verification. The physical design 108 also includes design rule check (DRC) and layout vs. schematic (LVS) module 208. DRC is performed on the physical layout to verify that the manufacturing process requirements have been satisfied. LVS is performed such that the devices and interconnects are extracted to generate a netlist for comparison with an original design netlist defined at circuit design 106. This step is sometimes referred to as sign-off verification as well.

The physical design 108 also includes a parasitic (such as resistance and capacitance) extraction module 210. Electrical parameter extraction of the physical layout is performed after the sign-off verification 208 has been accomplished. Parasitic resistance and capacitance of the interconnection and the devices are extracted based on the layout to reflect realistic electric characteristics of various circuit elements.

Figure 3:
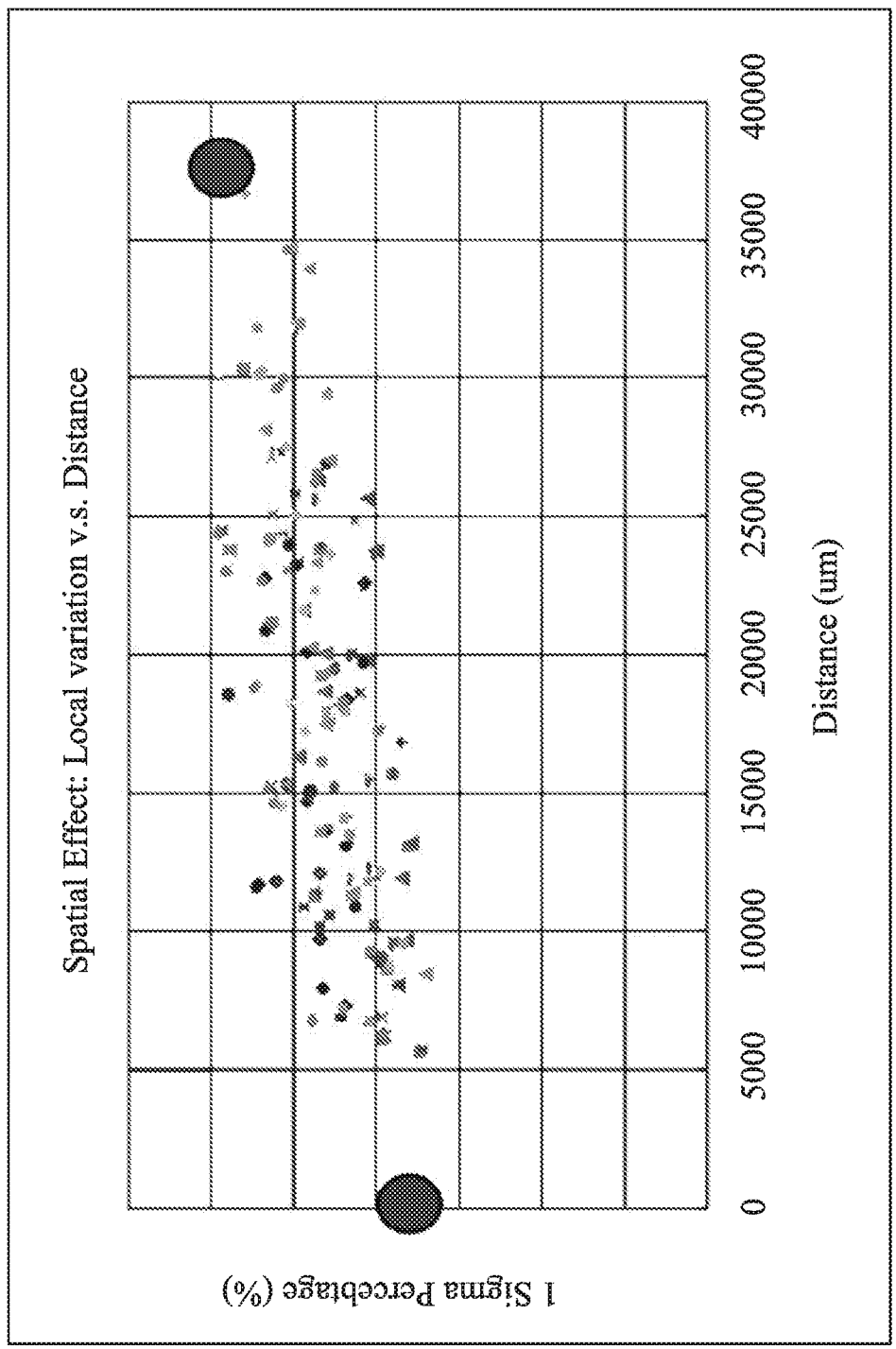
FIG. 3 illustrates experimental data showing OCV spatial effects.

In the present embodiment, the physical design 108 also includes an on-chip variation (OCV) with spatial correlation module 212. The OCV module 212 takes into account OCV spatial effects and randomizes the parasitic values with certain probability distribution. As illustrated in FIG. 3, local variations in device properties often are not a fixed value across the entire IC chip. Rather, they are related to distances between pairs of devices such as transistors. Therefore, OCV with spatial effects provides more realistic modeling than local variations. Device properties of interest may include capacitance, resistance, propagation delay, signal rise time, signal fall time, transistor threshold voltage, other MOSFET electrical parameters such as saturation region current, linear region current, and so on. The OCV module 212 may take as inputs some measurements of the pertinent properties on fabricated devices (also referred to as post-fabrication devices), thereby creating random variations closely correlated to manufacturing process such as the processes in mask creation 110 and IC fabrication 112. FIG. 2 illustrates a random distribution with a Gaussian-like distribution under the block 212, which is to be applied to selected nominal device properties. Random distributions other than or in addition to Gaussian-like distribution may also be utilized.

Figure 4:
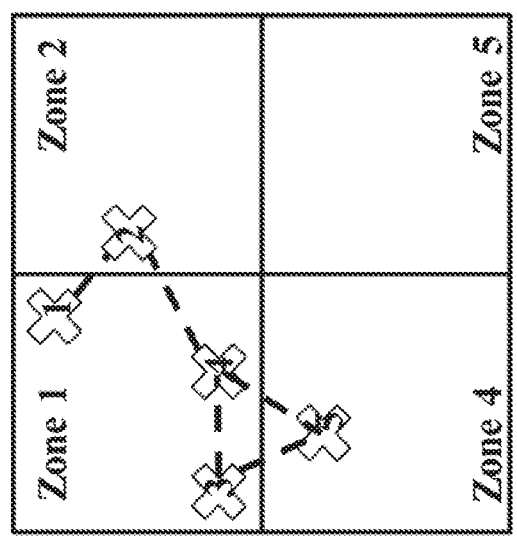
FIG. 4 illustrates one approach of modeling OCV spatial effects.

With the number of devices on an IC chip increases, it becomes increasingly challenging to efficiently model OCV with spatial effects. This is because the random distributions need to simultaneously satisfy spatial correlation constraints between all pairs of devices and the number of correlation constraints to be satisfied grows exponentially. One approach to OCV with spatial effects is to divide an IC chip into zones as illustrated in FIG. 4, where zones 1, 2, 4, and 5 are shown (other zones not shown). FIG. 4 also illustrates devices 1, 3, and 4 in zone 1; device 2 in zone 2; and device 5 in zone 4. Such approach reduces the number of calculations in the modeling process, but has some inherent issues of its own. For example, it does not consider spatial effects between devices in the same zone and creates abrupt changes in correlation when crossing the zone boundaries. As a result, correlation is no longer a pure function of distance between two devices, but becomes position-dependent. For example, while the distance between devices 1 and 4 is greater than the distance between devices 1 and 2, this approach generates correlation between devices 1 and 4 greater than correlation between devices 1 and 2, which may be inaccurate. Also, this approach generates correlation between devices 1 and 2 equal to correlation between devices 4 and 2 even though the distance between devices 1 and 2 is different from the distance between devices 4 and 2, which may also be inaccurate. Embodiments of the present disclosure provide a more accurate and yet very efficient approach to model OCV with spatial effects. More details of the OCV module 212 will be discussed in later sections of the present disclosure.

Referring back to FIG. 2, the physical design 108 further includes a back annotation module 214, which annotates the randomized device properties into the devices. This helps achieve more precise design analysis and simulation. The electrical parameters of all interconnect and devices are fed into the simulation module 204 to determine if further functionality and/or signal timing deviation appear according to the layout and the parasitic effects. In an embodiment, the simulation module 204 runs Monte Carlo simulations using the randomized values supplied by the OCV module 212. The layout will be further tuned or modified based on results of the simulations, for example, if the functionality or signal timing is out of specification. The tuning and modifying can be performed by the modules 202 and 206.

When both the sign-off verification 208 and simulation 204 indicate that the design layout is satisfactory, the physical design 108 proceeds to tape-out 220, i.e., to generate the data files for mask creation 110.

Figure 5:
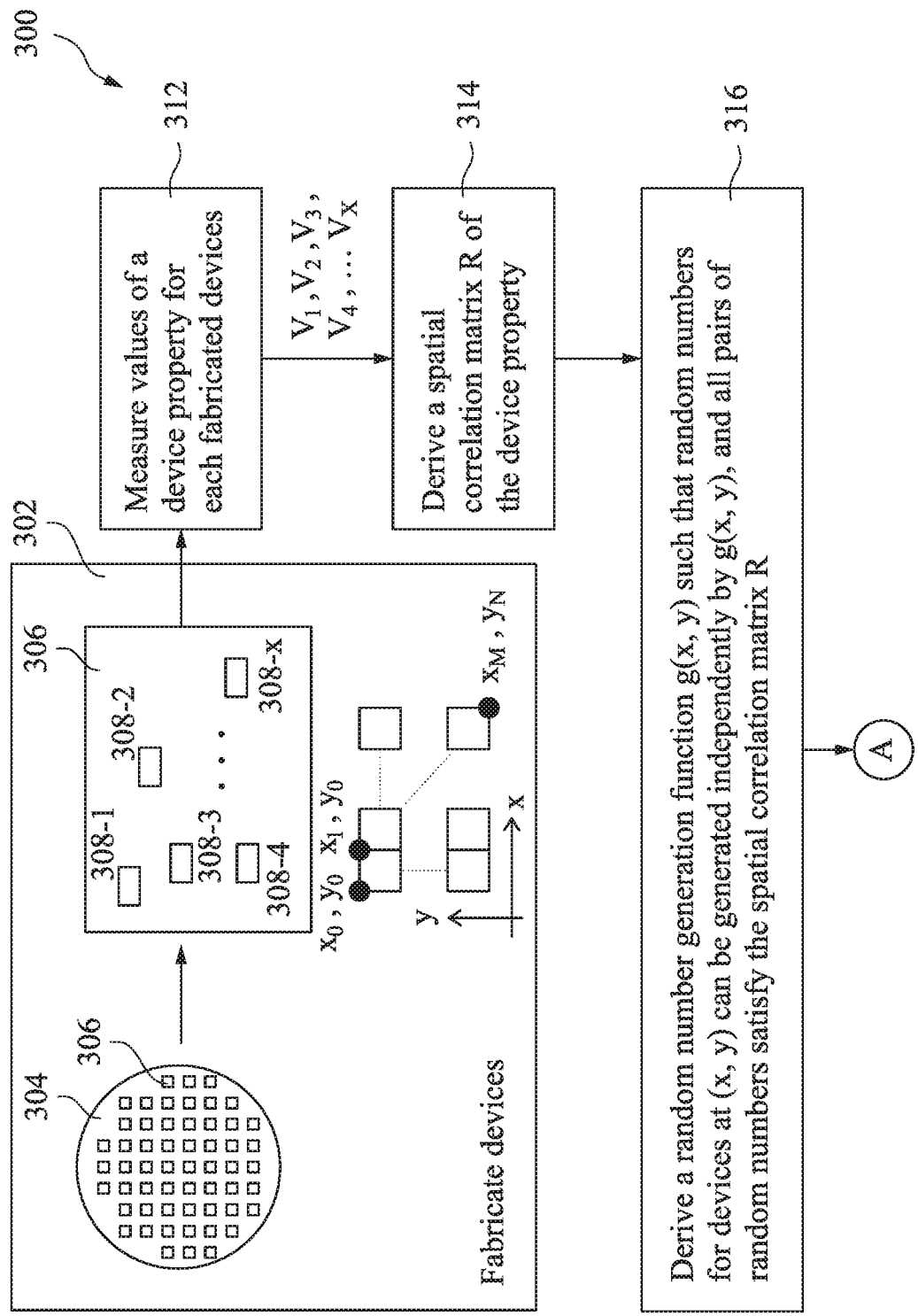
FIGS. 5 and 6 illustrate an example of an IC design and manufacturing flow according to various aspects of the present disclosure.
Figure 6:
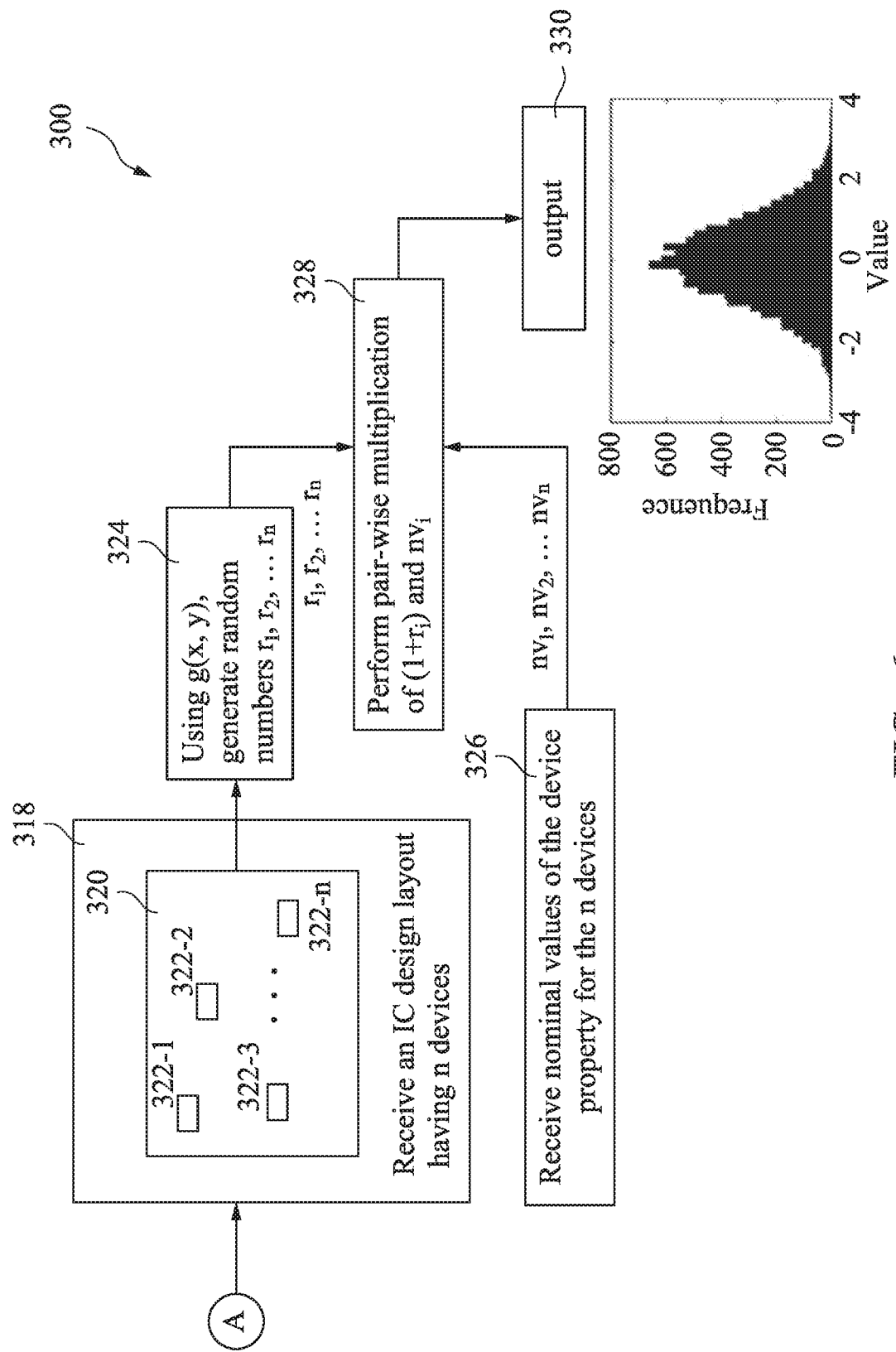

Referring now to FIGS. 5 and 6, shown therein is a method 300 of designing and manufacturing IC devices according to aspects of the present disclosure. Particularly, the method 300 takes into account OCV with spatial effects when performing various tasks in physical design 108. Additional operations can be provided before, during, and after the method 300, and some operations described can be replaced, eliminated, or moved around for additional embodiments of the method. The method 300 is an example, and is not intended to limit the present disclosure beyond what is explicitly recited in the claims.

At operation 302, the method 300 fabricates a plurality of devices 308 such as 308-1, 308-2, 308-3, 308-4, . . . and 308-$x$ (x number of devices 308). The devices (or post-fabrication devices) 308 include test patterns in an embodiment, which are used for characterizing one or more manufacturing processes and for obtaining data points for parasitic extraction and modeling OCV with spatial effects. For example, the devices 308 may include one or more transistors, resistor, capacitors, inductors, metal interconnects, vias, contacts, and/or other IC features. To further this embodiment, operation 302 fabricates the devices 308 using one or more test wafers 304 which include a plurality of dies 306. Each of the dies 306 includes the devices 308. Each of the devices 308 is associated with a coordinate on the die 306, which is designated as $(x_i, y_i)$ for the following discussion. Here, $(x_i, y_i)$ represents the coordinates of the device 308-$i$ in the "x" direction and in the "y" direction respectively. In the present embodiment, the "x" and "y" directions are perpendicular and define a plane that is parallel to the top surface of the wafer 304. In the example given in FIG. 5, the die 306 is virtually divided into N rows and M columns. The unit length in the "x" direction and in the "y" direction may be the same or different, each of which depends on the resolution of the devices 308 on the die 306. In another embodiment, the wafers 304 are production wafers, the dies 306 are production ICs, and the devices 308 are on the production ICs. Operation 302 fabricates the devices 308 using the manufacturing flow 100 in an example.

At operation 312, the method 300 measures values of a device property of interest. The measurements are done on a large number of devices 308 in order to get enough statistical data points. The device property may be capacitance, resistance, propagation delay, signal rise time, signal fall time, transistor threshold voltage, other MOSFET electrical parameters such as saturation region current, linear region current, and so on. In the example shown in FIG. 5, values $v_1, v_2, v_3, v_4, \ldots$ and $v_x$ are the measured data for the devices 308-1, 308-2, 308-3, 308-4, . . . and 308-$x$ respectively. Each of the $v_i$ may exhibit certain probability distribution, depending on the manufacturing processes, the design of the devices 308 and the dies 306, the position of a device 308 relative to other devices 308, and other factors.

At operation 314, the method 300 derives a spatial correlation matrix R of the selected device property from the measured values $v_1, v_2, v_3, v_4, \ldots$ and $v_x$. In an embodiment, the spatial correlation matrix R is in the form:

$$R = \begin{bmatrix} R_{0,0\_0,0} & R_{0,0\_1,0} & \cdots & R_{0,0\_M,0} \\ R_{0,0\_0,1} & R_{0,01,1} & & \\ \cdots & & & \cdots \\ R_{0,0\_0,N} & & & R_{0,0\_M,N} \end{bmatrix} \quad (1)$$

In another embodiment, the spatial correlation matrix R is in the form:

$$R = \begin{bmatrix} R_{0,0\_0,0} & R_{0,0\_1,0} & \cdots & R_{0,0\_M,N} \\ R_{1,0\_0,0} & R_{1,0\_1,0} & & \\ \cdots & & & \cdots \\ R_{M,N\_0,0} & & & R_{M,N\_M,N} \end{bmatrix} \quad (2)$$

In each of the equations (1) and (2), $R_{a,b\_c,d}$ = Correlation between the values of the device property of the devices 308 at coordinates $(x_a, y_b)$ and $(x_c, y_d)$, wherein each of a and c ranges in [0, M], and each of b and d ranges in [0, N].

In the present embodiment, the spatial correlation between any two devices 308 is a function of the Euclidean distance between the two devices. For example, for two arbitrary devices 308 at positions $(x_1, y_1)$ and $(x_2, y_2)$ respectively, the spatial correlation between the two, corr$((x_1, y_1), (x_2, y_2))$, is expressed as:

$$\text{corr}((x_1,y_1),(x_2,y_2)) = R_{a,b\_c,d} \text{ if } (|x_1-x_2|,|y_1-y_2|) = (|x_a-x_c|,|y_b-y_d|) \quad (3)$$

Each spatial correlation $R_{a,b\_c,d}$ is a real number and can be obtained through a statistics tool by inputting the values measured from the devices 308.

At operation 316, the method 300 uses the spatial correlation matrix R to derive a random number generation function g(x, y) such that random numbers for a device (in a new IC design) at coordinate (x, y) can be generated independently (independent of other devices in the new IC) by the function g(x, y), and all pairs of random numbers satisfy the spatial correlation matrix R.

Figure 7:
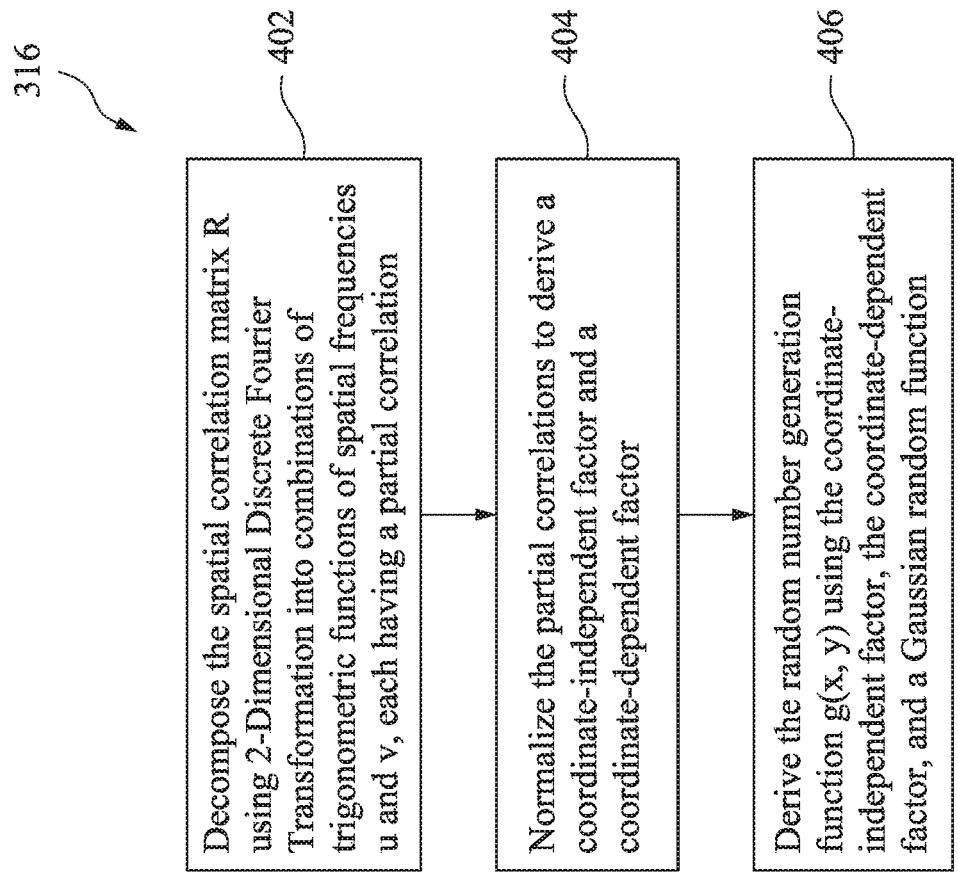
FIGS. 7 and 8 are embodiments of a step performed in the IC design and manufacturing flow of FIGS. 5 and 6, in accordance with an embodiment.

FIG. 7 illustrates an embodiment of the operation 316. Referring to FIG. 7, in this embodiment, the operation 316 includes steps 402, 404, and 406. In the step 402, the operation 316 decomposes the spatial correlation matrix R of equation (1) using 2-dimensional (2D) Discrete Fourier Transformation (DFT), thereby transforming the spatial correlation matrix R into combinations of trigonometric functions of spatial frequencies u and v, each pair (u, v) having a partial correlation. This operation may be expressed in the following equation:

$$R_{0,0\_x,y} = \frac{1}{\sum_{u=-N}^{N}\sum_{v=-M}^{M} F(u,v)} \sum_{u=-N}^{N}\sum_{v=-M}^{M}\left[F(u,v) \cdot \cos\left(\frac{2\pi u}{2N+1}x + \frac{2\pi v}{2M+1}y\right)\right] \quad (4)$$

Wherein:

$$\cos\left(\frac{2\pi u}{2N+1}x + \frac{2\pi v}{2M+1}y\right)$$

represents partial correlation at coordinate (x, y) by the spatial frequencies u and v, and F(u, v) represents relative contribution of the partial correlation by the spatial frequencies u and v at coordinate (x, y) to the overall spatial correlation.

In the step 404, the operation 316 normalizes the partial correlations to derive a coordinate-independent factor $A_i$ and a coordinate-dependent factor $\Omega_i(x, y)$ as follows:

$$A_i = \frac{\sqrt{F(u,v)}}{\sqrt{\sum_{u=-N}^{N}\sum_{v=-M}^{M} F(u,v)}} \quad (5)$$

$$\Omega_i(x,y) = \left(\cos\left(\frac{2\pi u}{2N+1}\cdot x + \frac{2\pi v}{2M+1}\cdot y\right) \pm \sin\left(\frac{2\pi u}{2N+1}\cdot x + \frac{2\pi v}{2M+1}\cdot y\right)\right) \quad (6)$$

The product of $(A_i \cdot \Omega_i(x, y))$ quantifies the relative contribution of the partial correlation by the spatial frequencies u and v at the coordinate (x, y). In equation (6), the sign "±" can be either "+" or "−."

In the step 406, the operation 316 derives the random number generation function g(x, y) using the coordinate-independent factor $A_i$, the coordinate-dependent factor $\Omega_i(x, y)$, and a Gaussian random function $\text{gauss}_{uv}$ (having values randomly distributed in a Gaussian distribution) as follows:

$$g(x,y) = \sum_{u=-N}^{N}\sum_{v=-M}^{M}\left[\frac{\sqrt{F(u,v)}}{\sqrt{\sum_{u=-N}^{N}\sum_{v=-M}^{M} F(u,v)}} \cdot \left(\cos\left(\frac{2\pi u}{2N+1}\cdot x + \frac{2\pi v}{2M+1}\cdot y\right) \pm \sin\left(\frac{2\pi u}{2N+1}\cdot x + \frac{2\pi v}{2M+1}\cdot y\right)\right) \cdot y \cdot \text{gauss}_{uv}\right] \quad (7)$$

The equation (7) can be re-written into the following form:

$$g(x,y) = \sum_{i=1}^{S}[A_i \cdot \Omega_i(x,y)] \cdot \text{gauss}_i \quad (8)$$

Wherein S=(2M+1)(2N+1).

In the above equation (5), the relative contribution $A_i$ at a spatial frequency (u, v) may be used to select the more important components for the random number generation function g(x, y). For example, if a relative contribution $A_i$ at a particular spatial frequency (u, v) is insignificant, the term $(A_i \cdot \Omega_i(x, y))$ may be pruned, thereby reducing the number of terms in the function g(x, y) and simplifying further calculations.

As can be seen from the equation (7) or (8), after a coordinate (x, y) is specified, the random number generation function becomes a weighted linear combination of Gaussian rand numbers $\text{gauss}_{uv}$. As a result, the random numbers generated for a certain device also follows Gaussian distribution. Further, the number of variations to be generated by OCV module 212 becomes a linear function of the number of devices, instead of an exponential function of the number of devices like in traditional approaches. This greatly reduces the calculation complexity in the OCV module 212.

Figure 8:
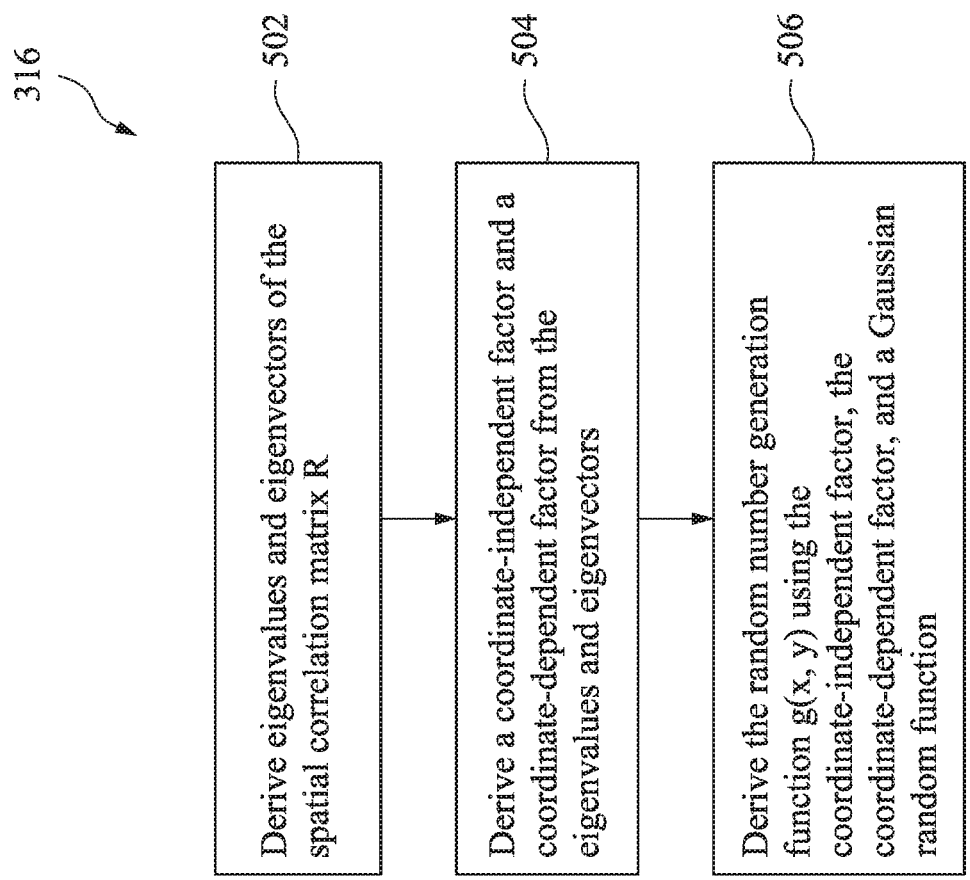

FIG. 8 illustrates another embodiment of the operation 316. Referring to FIG. 8, in this embodiment, the operation 316 includes steps 502, 504, and 506. In the step 502, the operation 316 uses Primary Component Analysis (PCA) to derive eigenvalues, $\lambda_1 \ldots \lambda_k$, and eigenvectors, $v_1 \ldots v_k$, of the spatial correlation matrix R of equation (2), such that:

$$R = \begin{bmatrix} \lambda_1 & & 0 \\ & \ldots & \\ 0 & & \lambda_K \end{bmatrix}[v_1 \ldots v_K]^T \quad (9)$$

Where K=(M+1)(N+1).

In the step 504, the operation 316 normalizes the partial correlations to derive a coordinate-independent factor $A_i$ and a coordinate-dependent factor $\Omega_i(x, y)$ as follows:

$$A_i = \sqrt{\lambda_i} \quad (10)$$

$$\Omega_i(x,y) = v_i(x,y) \quad (11)$$

The product of $(A_i \cdot \Omega_i(x, y))$ quantifies the relative contribution of every partial correlation at the coordinate $(x, y)$.

In the step 506, the operation 316 derives the random number generation function $g(x, y)$ using the coordinate-independent factor $A_i$, the coordinate-dependent factor $\Omega_i(x, y)$, and a Gaussian random function $gauss_{uv}$ (having values randomly distributed in a Gaussian distribution) as follows:

$$g(x, y) = \sum_{i=1}^{K} [\sqrt{\lambda_i} \cdot v(x, y)] \cdot gauss_i \quad (12)$$

In the above equation (10), the relative contribution $A_i$ may be used to select the more important components for the random number generation function $g(x, y)$. For example, if a relative contribution $A_i$ is insignificant, the term $(A_i \cdot \Omega_i(x, y))$ may be pruned, thereby reducing the number of terms in the function $g(x, y)$ and simplifying further calculations. In an embodiment, the relative contribution $A_i$ is insignificant when it is smaller than a threshold value.

The equations (7), (8), and (12) can be generalized into the following form:

$$g(x, y) = \sum_{i=1}^{K} [coef_i \cdot f_i(x, y)] \cdot gauss_i \quad (13)$$

As can be seen from the above equation (12) or (13), after a coordinate $(x, y)$ is specified, the random number generation function becomes a weighted linear combination of Gaussian rand numbers $gauss_{uv}$. As a result, the random numbers generated for a certain device also follows Gaussian distribution. Further, the number of variations to be generated by OCV module 212 becomes a linear function of the number of devices, instead of an exponential function of the number of devices like in traditional approaches. This greatly reduces the calculation complexity in the OCV module 212.

Referring to FIG. 6, the method 300 proceeds to operation 318 to receive an IC design layout 320 having n devices 322 including 322-1, 322-2, 322-3, . . . and 322-*n*, wherein each of the devices 322 is associated with a coordinate $(x, y)$ in the IC design layout 320. The IC design layout 320 has been processed by various steps of the IC design flow 100 (FIG. 1) and may be in the process of physical design as shown in FIG. 2, particularly being processed in the OCV module 212. Further, at operation 326, the method 300 receives nominal values $nv_1, nv_2, \ldots nv_n$ of a certain device property of the devices 322. The device property may be capacitance, resistance, propagation delay, signal rise time, signal fall time, transistor threshold voltage, other MOSFET electrical parameters such as saturation region current, linear region current, and so on. The nominal values are produced by the parasitic extraction module 210 in an embodiment of the method 300. The IC design layout 320 is to be fabricated on one or more wafers at process conditions that are the same as or substantially similar to the process conditions under which the wafers 304 were fabricated. To simulate the IC design layout 320 at realistic manufacturing conditions, it is highly desirable to vary these nominal values by giving them certain deterministic random variations. One of the random variations is the OCV with spatial effects as discussed above.

At operation 324, the method 300 uses the random number generation function $g(x, y)$ to produce a series of random numbers $r_1, r_2, \ldots, r_n$, one for each nominal values $nv_1, nv_2, \ldots nv_n$. In the present embodiment, operation 324 produces the random numbers by supplying each of the coordinates of the devices 322 into the function $g(x, y)$ shown in equation (7), (8), or (12). For each device, the number of function calls to $gauss_i$ is a linear function of the number of devices in the die 306. Therefore, the total number of calculations in operation 324 is a linear function of the number of devices in the die 306 and the number of devices in the IC design layout 320.

At operation 328, the method 300 performs pair-wise multiplication of $(1+r_i)$ with $nv_i$, wherein $i=1, 2, \ldots n$. The product $((1+r_i) \cdot nv_i)$ follows a Gaussian distribution such as shown in FIG. 6. At operation 330, the method 300 outputs the randomized device property values in a data format accessible by a further design tool or module, such as the back annotation module 214 or the simulation module 204, which may perform Monte Carlo simulations using the randomized device property values. In an embodiment, the method 300 stores the IC design layout 320 with the randomized device property values in a non-transitory memory, which can be accessed by a computerized design tool, such as the back annotation module 214 or the simulation module 204. In an embodiment, the OCV module 212 (FIG. 2) includes operations 316, 318, 324, 326, 328, and 330.

As described above, the IC design layout 320 is processed according to the IC design flow 100 (FIGS. 1 and 2). The randomized device property values according to aspects of the present disclosure enable more realistic simulation of the IC design layout 320 than conventional methods. When the IC design layout 320 is taped out (FIG. 2) and final IC products are fabricated (operations 110, 112, and 114 in FIG. 1), the final IC products will have better manufacturing yield.

Figure 9:
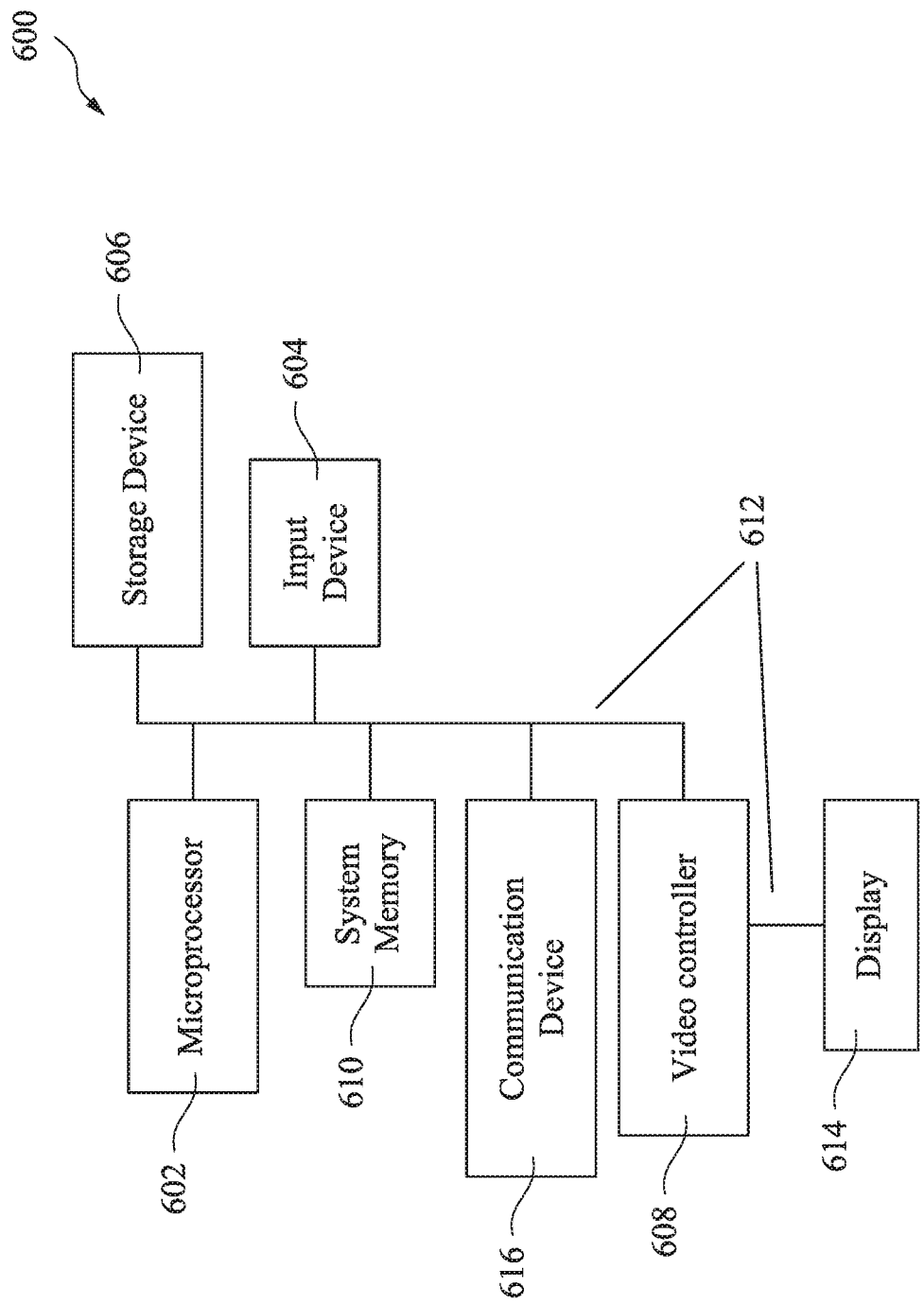
FIG. 9 is an illustration of a computer system for implementing one or more embodiments of the present disclosure.

Referring now to FIG. 9, shown therein is an illustrative IC design system (or computer system) 600 for implementing embodiments of the methods described above. For example, at least one of the operations 314, 316, 318, 324, 326, 328, and 330 is performed by the computer system 600. Further, one or more operations in FIG. 2 are performed by the computer system 600. Still further, one or more operations in FIGS. 7 and 8 are performed by the computer system 600.

Computer system 600 includes a microprocessor 602, an input device 604, a storage device 606, a video controller 608, a system memory 610, a display 614, and a communication device 616 all interconnected by one or more buses 612.

The microprocessor 602 represents one or more general-purpose processing devices such as a microprocessor, central processing unit, or the like. More particularly, the microprocessor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The microprocessor 602 may also be one or more special-purpose processing devices such as an application specific integrated circuit (ASIC), a field programmable gate array (FPGA), a digital signal processor (DSP), network processor, or the like. The microprocessor 602 is configured to execute instructions for performing the operations and steps discussed herein.

The storage device 606 is a non-transitory computer-readable storage media which comprises all computer-readable storage media except for a transitory, propagating signal. Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read. For example, the storage device 606 may be a floppy disk, a magnetic hard disk drive (HDD), a solid-state drive (SSD), or an optical memory (e.g., CD-ROM, DVD, and Blu-Ray Disc). In addition, the storage device 606 may be capable of receiving a floppy disk, CD-ROM, DVD-ROM, or any other form of computer-readable medium that may contain computer-executable instructions.

Further, communication device 616 could be a modem, network card, or any other device to enable the computer system to communicate with other nodes. It is understood that any computer system could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

The system may be designed to work on any specific architecture. For example, the system may be executed on a single computer, local area networks, client-server networks, wide area networks, internets, hand-held and other portable and wireless devices and networks.

Although not intended to be limiting, one or more embodiments of the present disclosure provide many benefits to IC design and manufacturing. For example, embodiments of the present disclosure provide a method for extracting OCV with spatial effects and applying such to a new IC design. Methods according to the present disclosure model OCV based on the coordinates of an individual device, therefore providing more accurate modeling than zone-based approaches. Further, calculation complexity of the OCV modeling methods according to the present disclosure is linear, rather than exponential, to the number of devices in an IC design layout. This greatly reduces the computing resources needed by the design tool.

In one exemplary aspect, the present disclosure is directed to a method for a computerized integrated circuit (IC) design tool. The method includes receiving a spatial correlation matrix, wherein each element in the spatial correlation matrix is a spatial correlation between values of a property of a set of post-fabrication IC devices having different coordinates. The method further includes deriving a random number generation function from the spatial correlation matrix, wherein the random number generation function has a coordinate-dependent factor and a coordinate-independent factor. The method further includes receiving an IC design layout having a set of pre-fabrication IC devices, each of the pre-fabrication IC devices having a coordinate and a first value of the property. The method further includes, for each of the pre-fabrication IC devices, generating a random number using the coordinate of the respective pre-fabrication IC device and the random number generation function. The method further includes, for each of the pre-fabrication IC devices, deriving a second value of the property by applying the random number to the first value. The method further includes running a simulation on the pre-fabrication IC devices with the second values of the property of the pre-fabrication IC devices, and modifying the IC design layout based on a result of the simulation. In this embodiment, at least one of the following operations is performed by a computer: the deriving of the random number generation function; the generating of the random number; the deriving of the second value of the property; and the running of the simulation.

In another exemplary aspect, the present disclosure is directed to a method for a computerized integrated circuit (IC) design tool. The method includes receiving a spatial correlation matrix, R, of values of a property of a set of IC devices that have been fabricated. Each element $R_{a,b\_c,d}$ in R is a correlation between the values of the property of the set of the post-fabrication IC devices at coordinates ($x_a$, $y_b$) and ($x_c$, $y_d$), wherein each of a and c ranges in [0, M] and each of b and d ranges in [0, N], and M and N are integers greater than 1. The method further includes performing a 2-dimensional Discrete Fourier Transformation (2-D DFT) to R, thereby deriving spatial frequencies u and v, such that $$R_{0,0\_x,y} = \frac{1}{\sum_{u=-N}^{N}\sum_{v=-M}^{M} F(u,v)} \sum_{u=-N}^{N}\sum_{v=-M}^{M}\left[F(u,v)\cdot\cos\left(\frac{2\pi u}{2N+1}x + \frac{2\pi v}{2M+1}y\right)\right]$$

The method further includes constructing a random number generation function g(x, y), wherein:

$$g(x, y) = \sum_{u=-N}^{N} \sum_{v=-M}^{M} \left[ \frac{\sqrt{F(u, v)}}{\sqrt{\sum_{u=-N}^{N} \sum_{v=-M}^{M} F(u, v)}} \cdot \left( \cos\left(\frac{2\pi u}{2N+1} \cdot x + \frac{2\pi v}{2M+1} \cdot y\right) \pm \sin\left(\frac{2\pi u}{2N+1} \cdot x + \frac{2\pi v}{2M+1} \cdot y\right) \right) \cdot gausss_{uv} \right],$$

wherein $gauss_{uv}$ is a random number having a Gaussian distribution. The method further includes receiving an IC design layout having a set of pre-fabrication IC devices, each of the pre-fabrication IC devices having a coordinate and a first value of the property. The method further includes, for each of the pre-fabrication IC devices, generating a random number using the coordinate of the respective pre-fabrication IC device and the random number generation function g(x, y). The method further includes storing the second values of the property of the pre-fabrication IC devices in a non-transitory memory for access by a computerized IC simulation tool. In this method, at least one of the following operations is performed by a computer: the performing of the 2-D DFT to R; the constructing of the random number generation function g(x, y); the generating of the random number using the coordinate of the respective pre-fabrication IC device and the function g(x, y); the deriving of the second value of the property; and the storing of the second values of the property of the pre-fabrication IC devices in the non-transitory memory.

In another exemplary aspect, the present disclosure is directed to a method for integrated circuit (IC) design. The method includes receiving a spatial correlation matrix, R, of values of a property of a set of post-fabrication IC devices. Each element $R_{a,b\_c,d}$ in R is a correlation between the values of the property of the set of the post-fabrication IC devices at coordinates $(x_a, y_b)$ and $(x_c, y_d)$, wherein each of a and c ranges in [0, M] and each of b and d ranges in [0, N], and M and N are integers greater than 1. The method further includes deriving eigenvalues, $\lambda_1 \ldots \lambda_k$, and eigenvectors, $v_1 \ldots v_k$, of R, such that:

$$R = \begin{bmatrix} \lambda_1 & & 0 \\ & \ldots & \\ 0 & & \lambda_k \end{bmatrix} [v_1 \ldots v_K]^T$$

The method further includes constructing a random number generation function g(x, y), wherein:

$$g(x, y) = \sum_{i=1}^{K} \left[ \sqrt{\lambda_i} \cdot v(x, y) \right] \cdot gauss_i$$

wherein $gauss_i$ is a random number having a Gaussian distribution. The method further includes receiving an IC design layout having a set of pre-fabrication IC devices, each of the pre-fabrication IC devices having a coordinate and a first value of the property. The method further includes, for each of the pre-fabrication IC devices, generating a random number using the coordinate of the respective pre-fabrication IC device and the random number generation function g(x, y), and deriving a second value of the property by multiplying the first value with a sum of one and the random number. The method further includes storing the second values of the property of the pre-fabrication IC devices in a non-transitory memory for use by an IC simulation tool in a process of manufacturing the IC design layout onto wafers. In this method, at least one of the following operations is performed by a computer: the deriving of the eigenvalues and eigenvectors of R; the constructing of the random number generation function g(x, y); the generating of the random number using the coordinate of the respective pre-fabrication IC device and the function g(x, y); and the deriving of the second value of the property.

In yet another exemplary aspect, the present disclosure is directed to an integrated circuit (IC) design system. The system includes a non-transitory memory and one or more hardware processors coupled to the non-transitory memory, the one or more hardware processors to execute instructions to perform operations that include receiving a spatial correlation matrix, R, of values of a property of a set of post-fabrication IC devices, wherein each element $R_{a,b\_c,d}$ in R is a correlation between the values of the property of the set of the post-fabrication IC devices at coordinates $(x_a, y_b)$ and $(x_c, y_d)$, wherein each of a and c ranges in [0, M] and each of b and d ranges in [0, N], wherein M and N are integers greater than 1. The operations further include performing a 2-dimensional Discrete Fourier Transformation (2-D DFT) to R, thereby deriving spatial frequencies u and v, such that:

$$R_{0,0\_x,y} = \frac{1}{\sqrt{\sum_{u=-N}^{N} \sum_{v=-M}^{M} F(u, v)}} \sum_{u=-N}^{N} \sum_{v=-M}^{M} \left[ F(u, v) \cdot \cos\left(\frac{2\pi u}{2N+1}x + \frac{2\pi v}{2M+1}y\right) \right]$$

The operations further include constructing a random number generation function g(x, y), wherein:

$$g(x, y) = \sum_{u=-N}^{N} \sum_{v=-M}^{M} \left[ \frac{\sqrt{F(u, v)}}{\sqrt{\sum_{u=-N}^{N} \sum_{v=-M}^{M} F(u, v)}} \cdot \left( \cos\left(\frac{2\pi u}{2N+1} \cdot x + \frac{2\pi v}{2M+1} \cdot y\right) \pm \sin\left(\frac{2\pi u}{2N+1} \cdot x + \frac{2\pi v}{2M+1} \cdot y\right) \right) \cdot gauss_{uv} \right]$$

wherein $gauss_{uv}$ is a random number having a Gaussian distribution.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   deriving a spatial correlation matrix, wherein each element in the spatial correlation matrix is a spatial correlation between values of a property of a set of post-fabrication IC devices each having a coordinate (x, y) on a die;
   deriving a random number generation function g (x, y) from the spatial correlation matrix, wherein the random number generation function g (x, y) has a coordinate-dependent factor and a coordinate-independent factor;
   receiving an IC design layout having a set of pre-fabrication IC devices, each of the pre-fabrication IC devices having a coordinate (x, y) in the IC design layout and a first value of the property;
   for each of the pre-fabrication IC devices, generating a random number using the coordinate (x, y) in the IC design layout and the random number generation function;
   for each of the pre-fabrication IC devices, deriving a second value of the property by applying the random number to the first value;
   running a simulation on the pre-fabrication IC devices with the second values of the property of the pre-fabrication IC devices; and
   modifying the IC design layout based on a result of the simulation.

2. The method of claim 1, wherein the deriving of the spatial correlation matrix comprises:
   fabricating the set of post-fabrication IC devices; and
   measuring values of the property of the set of post-fabrication IC devices having different coordinates.

3. The method of claim 2, wherein the set of post-fabrication IC devices includes test patterns.

4. The method of claim 1, wherein the spatial correlation matrix is represented as:

$$R = \begin{bmatrix} R_{0,0\_0,0} & R_{0,0\_1,0} & \cdots & R_{0,0\_M,0} \\ R_{0,0\_0,1} & R_{0,0\_1,1} & & \\ \cdots & & \cdots & \\ R_{0,0\_0,N} & & & R_{0,0\_M,N} \end{bmatrix}$$

where $R_{a,b\_c,d}$=correlation between the values of the property of the set of the post-fabrication IC devices at coordinates $(x_a, y_b)$ and $(x_c, y_d)$, each of a and c ranges in [0, M] and each of b and d ranges in [0, N], wherein M and N are integers greater than 1; and wherein the deriving of the random number generation function includes:
   performing a 2-dimensional Discrete Fourier Transformation (2-D DFT) to R, thereby deriving spatial frequencies u and v, such that:

$$R_{0,0\_x,y} = \frac{1}{\sum_{u=-N}^{N}\sum_{v=-M}^{M} F(u,v)} \sum_{u=-N}^{N} \sum_{v=-M}^{M} \left[ F(u,v) \cdot \cos\left(\frac{2\pi u}{2N+1} x + \frac{2\pi v}{2M+1} y\right) \right];$$

and
constructing the random number generation function g (x, y), wherein:

$$g(x,y) = \sum_{u=-N}^{N} \sum_{v=-M}^{M} \left[ \frac{\sqrt{F(u,v)}}{\sqrt{\sum_{u=-N}^{N}\sum_{v=-M}^{M} F(u,v)}} \cdot \left( \cos\left(\frac{2\pi u}{2N+1} \cdot x + \frac{2\pi v}{2M+1} \cdot y\right) \pm \sin\left(\frac{2\pi u}{2N+1} \cdot x + \frac{2\pi v}{2M+1} \cdot y\right) \right) \cdot gauss_{uv} \right]$$

wherein $gauss_{uv}$ is a random number having a Gaussian distribution.

5. The method of claim 4, further comprising, before the generating of the random number using the coordinate of the respective pre-fabrication IC device and the random number generation function g (x, y):
   pruning terms of the random number generation function g (x, y).

6. The method of claim 1, wherein the property of the set of IC devices includes one of: capacitance, resistance, propagation delay, signal rise time, signal fall time, transistor threshold voltage, saturation region current, and linear region current.

7. The method of claim 1, wherein the deriving of the second value of the property by applying the random number to the first value includes multiplying the first value with a sum of one and the random number.

8. The method of claim 1,
wherein the spatial correlation matrix is represented as:

$$R = \begin{bmatrix} R_{0,0\_0,0} & R_{0,0\_1,0} & \cdots & R_{0,0\_M,N} \\ R_{1,0\_0,0} & R_{1,0\_1,0} & & \\ \cdots & & \cdots & \\ R_{M,N\_0,0} & & & R_{M,N\_M,N} \end{bmatrix}$$

where $R_{a,b\_c,d}$=correlation between the values of the property of the post-fabrication IC devices at coordinates $(x_a, y_b)$ and $(x_c, y_d)$, each of a and c ranges in [0, M] and each of b and d ranges in [0, N], wherein M and N are integers greater than 1; and wherein the deriving of the random number generation function includes:
   deriving eigenvalues, $\lambda_1 \ldots \lambda_k$, and eigenvectors, $v_1 \ldots v_k$, of R, such that:

$$R = \begin{bmatrix} \lambda_1 & & 0 \\ & \cdots & \\ 0 & & \lambda_K \end{bmatrix} [v_1 \ldots v_K]^T;$$

and
constructing a random number generation function g(x, y), wherein:

$$g(x,y) = \sum_{i=1}^{K} \left[ \sqrt{\lambda_i} \cdot v(x,y) \right] \cdot gauss_i$$

wherein gauss$_i$ is a random number having a Gaussian distribution.

9. The method of claim 8, further comprising:
deriving the coordinate-independent factor, A$_i$, and the coordinate-dependent factor, Ω$_i$(x,y), wherein:
A$_i$=$\sqrt{\lambda_i}$, and
Ω$_i$(x,y)=v$_i$(x,y); and
pruning terms of (A$_i$·Ω$_i$(x, y)) from the random number generation function g(x, y) when A$_i$ is less than a threshold.

10. A method for integrated circuit (IC) design, comprising:
receiving a spatial correlation matrix, R, of values of a property of a set of post-fabrication IC devices each having a coordinate (x, y) on a die;
deriving eigenvalues, $\lambda_1 \ldots \lambda_k$, and eigenvectors, $v_1 \ldots v_k$, of R, such that:

$$R = \begin{bmatrix} \lambda_1 & & 0 \\ & \ldots & \\ 0 & & \lambda_k \end{bmatrix} [v_1 \ldots v_K]^T;$$

constructing a random number generation function g (x, y), wherein:

$$g(x, y) = \sum_{i=1}^{K} \left[\sqrt{\lambda_i} \cdot v(x, y)\right] \cdot gauss_i$$

wherein gauss$_i$ is a random number having a Gaussian distribution;
receiving an IC design layout having a set of pre-fabrication IC devices, each of the pre-fabrication IC devices having a coordinate (x, y) in the IC design layout and a first value of the property;
for each of the pre-fabrication IC devices, generating a random number using the coordinate (x, y) in the IC design layout and the random number generation function g (x, y); and
for each of the pre-fabrication IC devices, deriving a second value of the property by multiplying the first value with a sum of one and the random number.

11. The method of claim 10, wherein the spatial correlation matrix, R, is represented as:

$$R = \begin{bmatrix} R_{0,0\_0,0} & R_{0,0\_1,0} & \ldots & R_{0,0\_M,N} \\ R_{1,0\_0,0} & R_{1,0\_1,0} & & \\ \ldots & & \ldots & \\ R_{M,N\_0,0} & & & R_{M,N\_M,N} \end{bmatrix}$$

Where R$_{a,b\_c,d}$=Correlation between the values of the property of the post-fabrication IC devices at coordinates (x$_a$, y$_b$) and (x$_c$,y$_d$), each of a and c ranges in [0, M] and each of b and d ranges in [0, N], wherein M and N are integers greater than 1.

12. The method of claim 10, further comprising:
receiving the set of post-fabrication IC devices;
measuring the values of the property of the post-fabrication IC devices; and
deriving the spatial correlation matrix R.

13. The method of claim 10, further comprising:
deriving a coordinate-independent factor A$_i$ and a coordinate-dependent factor Ω$_i$ (x,y), wherein:

A$_i$=$\sqrt{\lambda_i}$, and

Ω$_i$(x,y)=v$_i$(x,y);

and
pruning terms of (A$_i$·Ω$_i$(x, y)) from the random number generation function g (x, y) when A$_i$ is less than a threshold.

14. The method of claim 10, further comprising:
running a simulation of the IC design layout with the second values of the property of the pre-fabrication IC devices.

15. The method of claim 14, further comprising:
modifying the IC design layout if the simulation of the IC design layout is not satisfactory; and
taping out the IC design layout when the simulation of the IC design layout is satisfactory.

16. An integrated circuit (IC) design system, comprising:
one or more processors configured to execute instructions to perform operations comprising:
receiving an IC design layout having a set of pre-fabrication IC devices, each of the pre-fabrication IC devices having a coordinate and a first value of a property;
receiving a spatial correlation matrix, R, of values of the property of a set of post-fabrication IC devices, wherein each element R$_{a,b\_c,d}$ in R is a correlation between the values of the property of the set of post-fabrication IC devices at coordinates (x$_a$, y$_b$) and (x$_c$, y$_d$), wherein each of a and c ranges in [0, M] and each of b and d ranges in [0, N], wherein M and N are integers greater than 1;
performing a 2-dimensional Discrete Fourier Transformation (2-D DFT) to R, thereby deriving spatial frequencies u and v, wherein each pair of the spatial frequencies u and v has a partial correlation at each of coordinate (x, y);
constructing a random number generation function g (x, y) based on the spatial frequencies u and v;
generating random numbers using the coordinates of the pre-fabrication IC devices and the random number generation function g (x, y); and
deriving second values of the property by applying the random numbers to the first values.

17. The IC design system of claim 16, the operations further comprising:
annotating the second values of the property into the IC design layout.

18. The IC design system of claim 17, the operations further comprising:
simulating the IC design layout with the second values of the property of the pre-fabrication IC devices.

19. The IC design system of claim 18, the operations further comprising:
taping-out the IC design layout when the simulation of the IC design layout is satisfactory.

20. The IC design system of claim 16, the operations further comprising:
pruning terms of the random number generation function g (x, y).

* * * * *